(12) United States Patent
Roland

(10) Patent No.: US 8,995,978 B2
(45) Date of Patent: Mar. 31, 2015

(54) EMERGENCY CALL CAPABLE WIRELESS DEVICE PROVISIONING

(75) Inventor: Gruber Roland, Sauerlach (DE)

(73) Assignee: Intel Mobile Communications GmbH, Santa Clara, CA (US)

( * ) Notice: Subject to any disclaimer, the term of this patent is extended or adjusted under 35 U.S.C. 154(b) by 288 days.

(21) Appl. No.: 12/483,665

(22) Filed: Jun. 12, 2009

(65) Prior Publication Data

US 2010/0317314 A1    Dec. 16, 2010

(51) Int. Cl.
*H04M 11/04* (2006.01)
*H04W 4/22* (2009.01)
*H04W 76/00* (2009.01)

(52) U.S. Cl.
CPC ............... *H04M 11/04* (2013.01); *H04W 4/22* (2013.01); *H04W 76/007* (2013.01)
USPC .......................................... 455/418; 455/419

(58) Field of Classification Search
USPC ......... 455/404.1, 404.2, 414.1, 521, 418, 419
See application file for complete search history.

(56) References Cited

U.S. PATENT DOCUMENTS

| | | | |
|---|---|---|---|
| 7,894,795 B1 * | 2/2011 | Dunne et al. | 455/406 |
| 2008/0153454 A1 * | 6/2008 | Haapapuro et al. | 455/404.1 |
| 2009/0156201 A1 * | 6/2009 | Pudney et al. | 455/426.1 |
| 2009/0253403 A1 * | 10/2009 | Edge et al. | 455/404.2 |
| 2009/0298458 A1 * | 12/2009 | Bakker et al. | 455/404.1 |

* cited by examiner

*Primary Examiner* — Ariel Balaoing
*Assistant Examiner* — Christopher Kohlman
(74) *Attorney, Agent, or Firm* — Schwegman Lundberg & Woessner, P.A.

(57) ABSTRACT

The present disclosure relates provisioning a wireless capable device as an emergency call apparatus. In one implementation, a wireless capable device or apparatus receives a provisioning message from a provider of wireless voice and data services, the message including emergency call provisioning information to provision the wireless capable device or apparatus as an emergency call device.

19 Claims, 4 Drawing Sheets

EMERGENCY CALL CAPABLE WIRELESS DEVICE PROVISIONING

BACKGROUND

Emergency response systems, both public and private, continuously strive to improve their system response times to emergencies in an effort to provide reliable, quick and accurate emergency assistance to the general public and customers. One such improvement effort is the emergency call ("eCall") service under development.

eCall refers to an interoperable in-vehicle emergency call service, which is envisioned to be introduced and operated across Europe. Various standardization bodies, the automotive industry, mobile telecommunication industry, public emergency authorities and others have come together to develop the technology that will bring eCall to the market. It is further envisioned that eCall will be operated in other countries.

The introduction and use of in-vehicle eCall for deployment of emergency assistance is expected to save many lives and reduce social burden by improving the notification of road accidents and speeding up emergency service response. In the event of a collision, accident or emergency condition, the intended solution can automatically or manually establish an emergency voice call via the cellular network to the local emergency agencies, i.e., a Public-Safety Answering Point (PSAP). Aside from enabling two-way speech communication between the motorist and a PSAP operator, eCall also allows transfer of a data message from the In-Vehicle System (IVS) over the cellular network to the PSAP which is denoted as eCall Minimum Set of Data (MSD). The MSD includes vehicle location information, time stamp, number of passengers, Vehicle Identification Number (VIN), and other relevant information.

Dedicated eCall devices, such as those associated with a vehicle and designed for the sole purpose to make emergency calls in the event of an accident, are generally referred to as devices that operate in "eCall only mode." That is, eCall only mode requires at least that the device does not perform mobility management procedures, including registration on a Public Land Mobile Network (PLMN), except when the device is attempting to initiate and during an emergency call, or when the device is attempting to initiate a test or reconfiguration connection. One proposal is to require storing the information for establishing the eCall only mode in the operator provided Universal Subscriber Identity Module (USIM), Subscriber Identity Module (SIM), or the like. To realize this proposal might require each entity or operator issuing such modules to preload eCall only mode information in the modules before the modules are incorporated in dedicated eCall devices.

Provisioning of eCall capable devices using information stored on a USIM, SIM, or the like, is a rigid solution. That is, based on the foregoing proposal, enabling a device to operate in eCall only mode requires the device to incorporate a USIM, SIM, or the like, that has been provisioned to include information indicating that the device is an eCall only mode device. Switching a device from eCall only mode to "normal" wireless mode may require removing the USIM, SIM, or the like, and replacing the USIM, SIM, or the like, with a USIM, SIM, or the like, that enables the device to interface with a cellular network in normal wireless mode.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

The following description describes implementations related to provisioning a wireless device or apparatus as an emergency call ("eCall") capable device. The process of provisioning the wireless device or apparatus as an eCall capable device may include receiving a message from a wireless service network provider. The message may include an eCall toggeable indicator that initiates placing the wireless device or apparatus in a state that enables the wireless device or apparatus as an eCall capable device. The eCall toggeable indicator may also be used to initiate placing a wireless device or apparatus that is currently an eCall capable device in a state that enables the wireless device or apparatus as a conventional mobile phone, or the like. In one implementation, a wireless device or apparatus that is enabled as an eCall capable device is operationally limited to functioning as an eCall capable device. Such a state is also know in wireless standards as "eCall only mode." In another implementation, a wireless device or apparatus that is enabled as an eCall capable device is functionally capable of operating as an eCall capable device, but the wireless device or apparatus also retains or is enabled with functionalities of conventional mobile phones (e.g., SMS functionality and voice connectivity features). More generally, according to the implementations described herein, the wireless service network provider may use any communication or message for transmission to the wireless device or apparatus as a medium to carry the information to trigger the provisioning of a wireless device or apparatus as an eCall capable device.

Unless otherwise stated, the use of "eCall capable device" herein refers to a device that has emergency calling and other functionalities, or a device that has functionalities limited to emergency calling (i.e., a device in eCall only mode).

Figure 1:
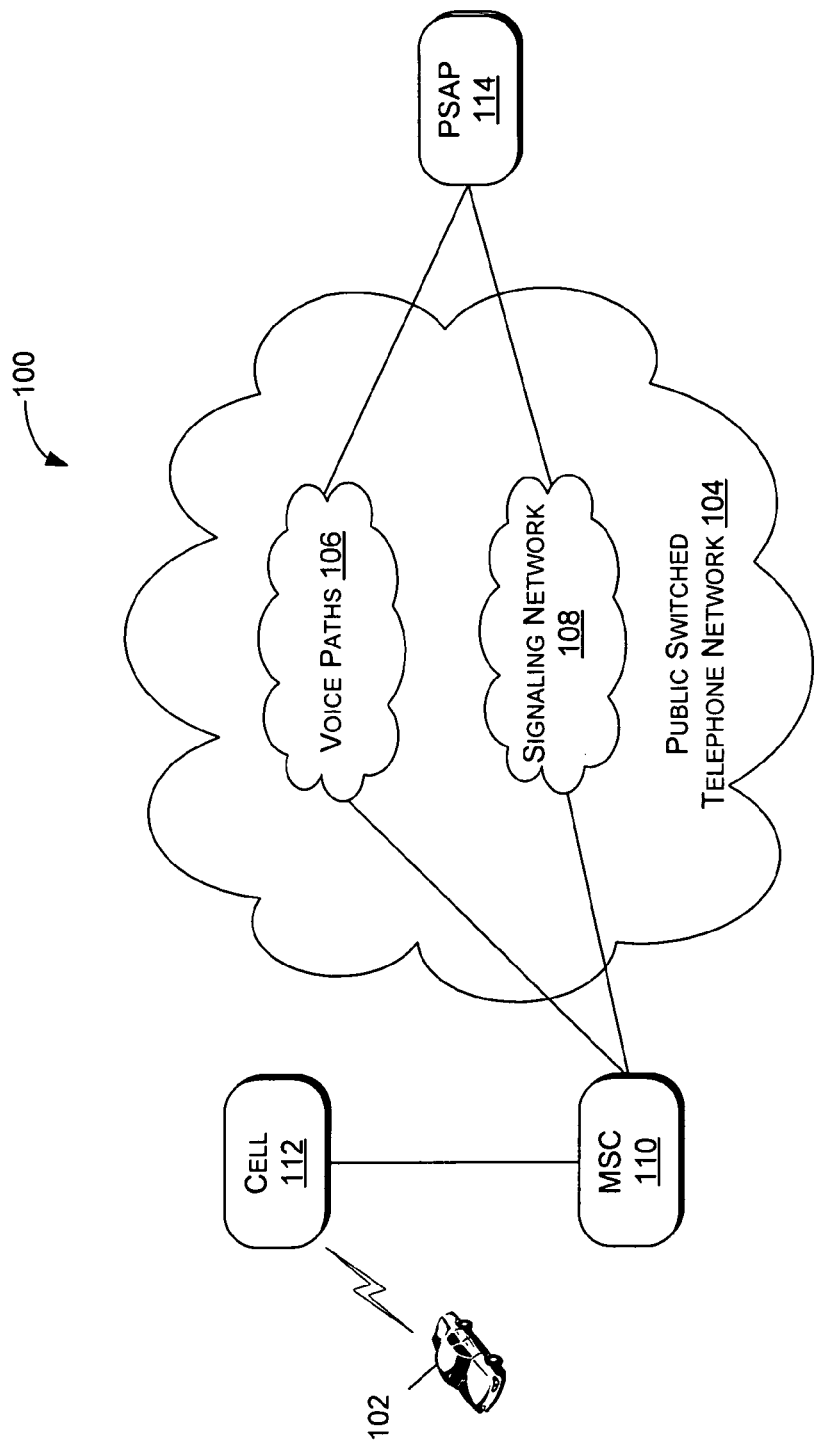
FIG. 1 is a diagram of a communications network that may be in communication with a vehicle that implements an emergency call ("eCall") capable device according the implementations described herein.

FIG. 1 is a diagram of a communications network 100 that may be in communication with a vehicle 102 that implements an eCall capable device according the implementations described herein. The eCall capable device may be an integral part of the vehicle 102, or the device may be an accessory added to the vehicle 102. Such an accessory includes, mobile phones and other wireless communication devices, positioning devices (e.g., GPS), and the like.

The communications network 100 may include a Publicly Switched Telephone Network (PSTN) 104. The PSTN 104 may generally include a plurality of voice paths 106 and a signaling network 108 that handles data communications. Other components, which are known, such as signal transfer points, tandem switching systems, local switching systems, selective routers, and the like, are not illustrated in the communications network 100 of FIG. 1.

A mobile switching center (MSC) 110 may be connected to PSTN 104 via both the voice paths 106 and signaling network 108. The MSC 110 is part of Public Land Mobile Network (PLMN). Because the PLMN is known in the art, the PLMN is not further illustrated or described herein. The MSC 110 may be connected to a plurality of cell sites, represented herein as a cell site 112, either directly or via base station controllers (not illustrated). Each cell site 112 supports telephony functions for a plurality of mobile communications devices, represented by the vehicle 102 that implements a wireless device or apparatus that may be provisioned as an eCall capable device according the implementations described herein.

The communications network 100 may include a plurality of Public Safety Answering Points (PSAP), represented herein as a Public Safety Answering Point (PSAP) 114. Generally, the PSAP 114 is a call center responsible for answering calls to an emergency telephone number for police, firefighting, and ambulance services. The PSAP 114 may be connected to the PSTN 104 via a selective router (not illustrated) to both the voice paths 106 and the signaling network 108. Each PSAP 114 may serve a predefined geographical area.

The communications network 100 may operate using analog or digital voice and data signaling protocols. Examples of voice signaling protocols include Code Division Multiple Access (CDMA), Time Division Multiple Access (TDMA), and Global System for Mobile Communications (GSM), among others. Examples of data signaling protocols include General Packet Radio Service (GPRS), High-Speed Circuit-Switched Data (HSCSD), among others.

Figure 2:
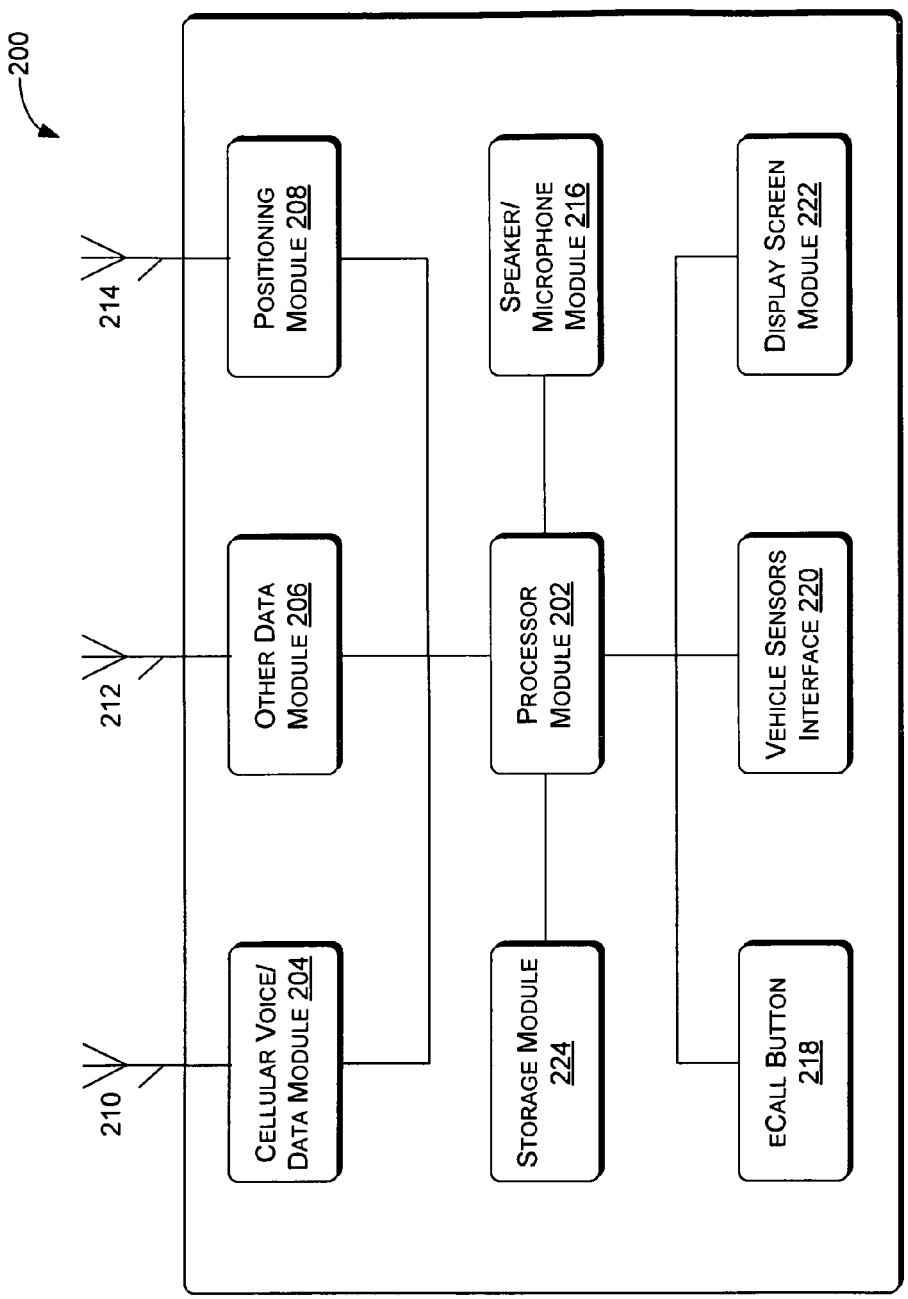
FIG. 2 is a diagram of a wireless device or apparatus that may be provisioned to operate as an eCall capable device according to the implementations described herein.

FIG. 2 is a diagram of a wireless device or apparatus 200 that may be provisioned to operate as an eCall capable device according to the implementations described herein. The wireless device or apparatus 200 may include a processor module 202 coupled to a plurality of wireless modules that enable the wireless device or apparatus 200 to communicate wirelessly. The wireless modules may include a cellular voice/data module 204, an other data module 206 (e.g., Bluetooth module), and a positioning module 208 (e.g., GPS module). The wireless device or apparatus 200 is not limited to the illustrated wireless modules. Each of the wireless modules is coupled to an antenna 210, 212 and 214, respectively. Although the antennas 210, 212 and 214 are shown as separate antennas, a single unitary antenna may also be used and coupled to the modules 204-208.

The processor module 202 may also be coupled to a speaker/microphone module 216, an eCall button 218, a vehicle sensors interface 220 and a display module 222. Furthermore, the processor module 202 may be coupled to a storage module 224. The storage module 224 may include information that provisions the wireless device or apparatus 200 as an eCall capable device. The eCall button 218 may be used to manually initiate an emergency call in the event of an accident or other situation requiring attention or assistance from emergency services. The vehicle sensors interface 220 may be coupled to sensors (not illustrated) deployed in a vehicle and designed to detect an accident condition that may require attention or assistance from emergency services. Such vehicle sensors may be attached to an airbag deployment mechanism, vehicle body integrity sensors, or the like.

The wireless device or apparatus 200 may be configured to transmit and receive voice and data communications to and from the MSC 110 via the cell site 112. When the wireless device or apparatus 200 is configured as an eCall capable device, the MSC 110 enables emergency information from the apparatus 200 to be communicated to the PSAP 114 via the PSTN 104. Such emergency information may be communicated to the PSAP 114 once the eCall capable device initiates an emergency call using designated emergency numbers (e.g., 112 or 911) stored in the device. The emergency information may include voice communications directly from a user and via the speaker/microphone module 216, data generated from sensors coupled to the vehicle sensors interface 220, and positioning information from the positioning module 208.

The MSC 110 may wirelessly send information to the wireless device or apparatus 200 that provisions the wireless device or apparatus 200 as an eCall capable device. As indicated, such provisioning information may be stored in the storage module 224. The storage module 224 may be a nonvolatile storage, volatile storage, a Subscriber Identity Module (SIM), a Universal Subscriber Identity Module (USIM), or any other suitable storage capable element.

Depending on the targeted implementation, the wireless device or apparatus 200, or parts thereof, may be an integral part of the vehicle 102. Alternatively, the wireless device or apparatus 200, or parts thereof, may be a separate component included in a device such as a portable Telematics device, cellular or Personal Communication System (PCS), a pager, or a hand-held computing device such as a personal digital assistant (PDA) that is docked or otherwise connected to a Telematics system within the vehicle 102.

Each of the wireless modules 204-208 includes a transmitter to transmit and encode voice and data messages using antennas 210-214, respectively, via an over-the-air protocol such as CDMA, WCDMA, GSM, TDMA, or the like. The wireless modules 204-208 may also be configured to transmit by other wireless communications, such as satellite communications. Each of the wireless modules 204-208 also includes a receiver to receive and decode voice and data messages from the cell site 112, the MSC 110 and the PSAP 114, or any other component associated with the communications network 100. Such received voice and data messages may be received via an over-the-air protocol such as CDMA, WCDMA, GSM, TDMA, or the like. The wireless modules 204-208 may also be configured to receive other wireless communications, such as satellite communications. The transmitters and receivers may be integrated transceiver devices.

The speaker/microphone module 216 may be used during voice calls between the wireless device or apparatus 200 and the PSAP 114. Telematics application specific buttons, such as the eCall button 218, may be used to wake an application or otherwise initiate the generation and transmittal of specific data messages and voice communications to the PSAP 114. Furthermore, initiation of data communication may also be accomplished automatically via vehicle sensors, such as sensors coupled to the airbag deployment mechanism.

Figure 3:
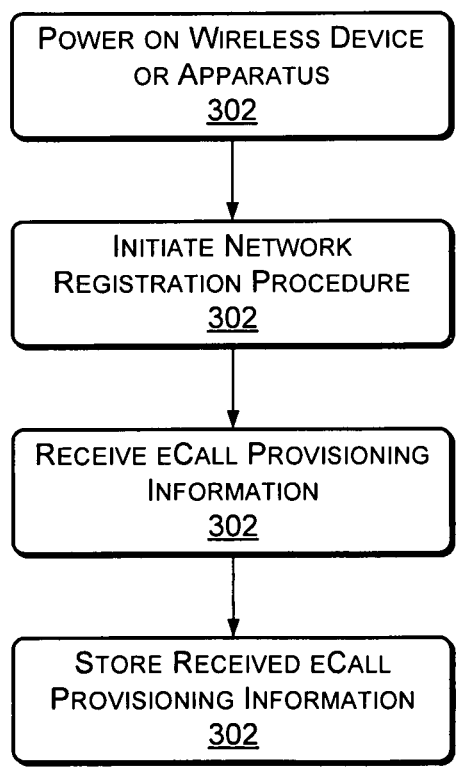
FIG. 3 is a flow diagram of a procedure to provision a wireless device or apparatus as an eCall capable device according to the implementations described herein.

FIG. 3 is a flow diagram of a procedure 300 to provision the wireless device or apparatus 200 as an eCall capable device. Reference is made to FIGS. 1-2 to aid the discussion of the provisioning procedure. However, the provisioning procedure is compatible with wireless networks and devices other than those illustrated and discussed herein.

Specifics of exemplary procedures are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

At block 302, the wireless device or apparatus 200 is powered on. This may occur when a user initiates a "power on" of the wireless device or apparatus 200, or when the vehicle 102 is started. Act 302 may be unnecessary if the wireless device or apparatus 200 is coupled to a power source that is always on.

At block 304, the wireless device or apparatus 200 initiates a network registration procedure. As those skilled in the art appreciate, network registration procedures may vary, depending on the wireless network protocol used and the governing wireless standards body. Nonetheless, the registration procedure often requires the wireless device or apparatus 200 to scan the available frequency bands for a forward (base) channel that the apparatus 200 can lock onto. Once a frequency lock is achieved, the wireless device or apparatus 200 and the MSC 110 begin exchanging messages, via the cell site 112, which are used to authenticate the wireless device or apparatus 200 to the MSC 110. As part of the message exchange process, the apparatus 200 may send a Location Update and Attach Request Messages to the MSC 110. The MSC 110 may respond by sending an Attach Response Message to the wireless device or apparatus 200. The Attach Response Message may include a Temporary Mobile Subscriber Identity (TMSI) that is used to identify the wireless device or apparatus 200 to the MSC 110.

At block 306, an Attach Response Message, or any other message from the MSC 110, is received by the wireless device or apparatus 200. In addition to the TMSI and other configuration information, the Attach Response Message may also include information that may be used to initiate provisioning the wireless device or apparatus 200 as an eCall capable device. The information that enables provisioning the wireless device or apparatus 200 as an eCall capable device may be a toggleable indicator that is useable to initiate placing the wireless device or apparatus 200 in eCall mode. The toggleable indicator may also be used to initiate provisioning the wireless device or apparatus 200 that is already in eCall mode (i.e., emergency call enabled) to a non-eCall mode. A device or apparatus 200 that is not enabled as an eCall capable device is assumed to include functionalities normally associated with conventional wireless devices (e.g., voice and data communication functionality, SMS messaging, or other such wireless device capabilities).

In one implementation, when the wireless device or apparatus 200 is in eCall mode, the apparatus 200 is limited to functioning as an eCall only capable device (eCall only mode). That is, eCall only mode requires at least that the apparatus 200 does not perform mobility management procedures, including registration on a Public Land Mobile Network (PLMN), except when attempting to initiate and during an emergency call, or to initiate a test or reconfiguration connection of the apparatus 200 upon request from the user. Furthermore, in eCall only mode, the apparatus 200 should that have the ability to be called back by the PSAP 114. In particular, the apparatus 200 should be capable to continue mobility management procedures for a limited duration following the termination of the eCall. In another implementation, when the wireless device or apparatus 200 is in eCall mode, the apparatus 200 is not limited to functioning as an eCall only capable device. That is, an apparatus 200 that is not limited to functioning as an eCall only capable device retains certain functionalities associated with ordinary wireless communication devices. Such functionalities may include normal voice and data communication functionality, SMS messaging, or other such wireless device capabilities.

The information that enables provisioning the wireless device or apparatus 200 as an eCall capable device may also include additional information that enables a wireless device or apparatus 200 that is in eCall only mode to establish a non-emergency communication session to obtain configuration information or perform diagnostics routines. Furthermore, the information that enables eCall provisioning, may also include timing information that establishes a time duration that enables a wireless device or apparatus 200 that is in eCall only mode to establish wireless communications as if the apparatus were in an operational state other than the eCall only mode. That is, during such a time duration, a wireless device or apparatus 200 enabled in eCall only mode may initiate or receive calls via the communications network 100.

At block 308, the information that may be used to provision the wireless device or apparatus 200 as an eCall capable device is stored in the storage module 224.

Figure 4:
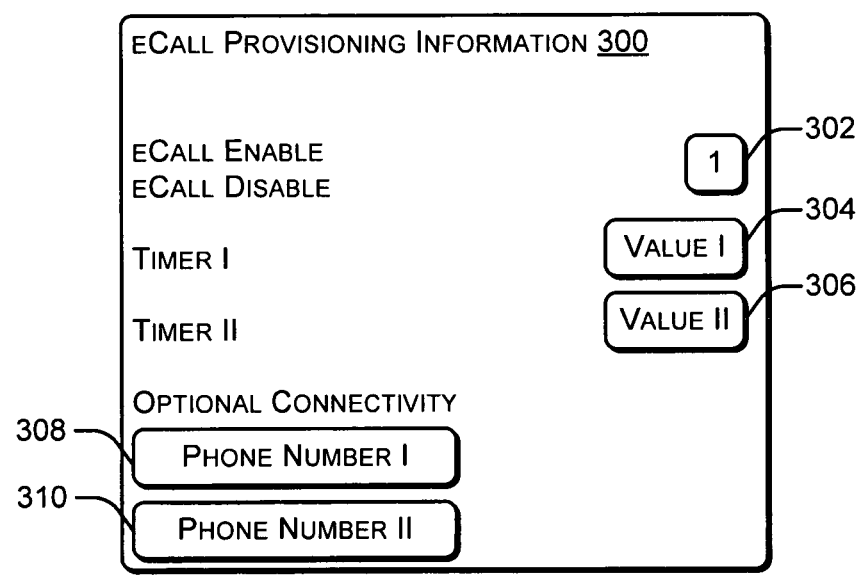
FIG. 4 illustrates an exemplary eCall provisioning information that may be used to provision a wireless device or apparatus as an eCall capable device according to the implementations described herein.

FIG. 4 illustrates an exemplary eCall provisioning information 300 that may be used to provision the wireless device or apparatus 200 as an eCall capable device. The illustrated eCall provisioning information 300 is not limited to the format or content shown in the FIG. 4 and described herein. The eCall provisioning information 300 may be embedded in a message generated by a wireless communications network provider. Such a message may only incorporate the eCall provisioning information 300, or the message may include other information in addition to the eCall provisioning information 300.

The eCall provisioning information 300 may include a field 302 that includes a bit that may be toggled between '1' and '0'. In this exemplary implementation, a '1' will initiate the provisioning of the wireless device or apparatus 200 so that it functions as an eCall capable device, or an eCall only capable device (eCall only mode); a '0' will initiate the provisioning of a wireless device or apparatus 200 currently enabled as an eCall capable device, or an eCall only capable device, as a non-emergency call capable device.

The eCall provisioning information 300 may also include a timer value I 304 and a time value II 306. The value 304 may be used to ensure that the apparatus 200 in eCall only mode will have the ability to be called back by the PSAP 114 or another party for a time duration defined by the value 304. The value 306 may be used to ensure that the apparatus 200 will have the ability to interface with test and configuration facilities for a time duration defined by the value 306. In particular, the apparatus 200 should be capable to continue mobility management procedures for a limited duration following the termination of an eCall or any other connection established, e.g. for test or reconfiguration purposes. The values 304 and 306 may be used to set the limited time duration for connecting to the PSAP 114 and the test and configuration facilities, respectively. The values 304 and 306 may be in timestamp format, define minute, hour, or day duration, or the like.

In addition, the provisioning information 300 may also include optional connectivity phone number I 308 and phone number II 310. The phone numbers 308 and 310 may be used by the apparatus 200 enabled as an eCall capable device to initiate a test or reconfiguration connection upon request from the user or the processor module 202. The number of phone numbers illustrated in FIG. 4 is merely exemplary.

The eCall provisioning information 300 may implemented by a computer, processor or other computing device based on instructions stored on one or more computer-readable storage media. The computer-readable storage media can be any available media that can be accessed by a computing device to implement the instructions stored thereon. Moreover, the eCall provisioning information 300 may be included in a message that is stored on computer-readable storage media associated with the wireless device or apparatus 200. Furthermore, the eCall provisioning information 300 may be included in a message that is stored on computer-readable storage media associated with wireless communications network provider.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. An apparatus, comprising:
 a processing module;
 a transceiver module coupled to the processing module, the transceiver module to receive and transmit wireless signals, the wireless signals comprising a transmitted Attach Request Message sent from the apparatus to a mobile service center (MSC) after a network registration procedure is initiated by the apparatus, and the wireless signals further comprising a received Attach Response Message, the Attach Response Message comprising a subscriber identity that is used to identify the apparatus to the MSC and emergency call provisioning information that is different from the subscriber identity; and
 a storage module coupled to the processing module, the storage module to store the emergency call provisioning information received by the transceiver module via the Attach Response Message, the emergency call provisioning information including a toggleable indicator that is useable to initiate provisioning of the apparatus as an emergency call only apparatus or an apparatus that functions as a non-emergency call apparatus, the emergency call provisioning information to provision the apparatus as an emergency call apparatus.

2. The apparatus of claim 1, wherein the emergency call provisioning information is received as part of a network registration procedure initiated by the apparatus.

3. The apparatus of claim 1, wherein the emergency call provisioning information is received as part of a message from a wireless communications network provider, the message including at least an identification that identifies the apparatus to the wireless communications network provider.

4. The apparatus of claim 3, wherein the identification included in the message is a Temporary Mobile Subscriber Identity (TMSI).

5. The apparatus of claim 3, wherein the message including the emergency call provisioning information is an Accept message from the wireless communications network provider.

6. The apparatus of claim 3, wherein the emergency call provisioning information further includes timing information to establish a time duration that enables the apparatus to receive and establish wireless communications as if the apparatus were a non-emergency ca apparatus.

7. The apparatus of claim 3, wherein the emergency call provisioning information further includes contact information that enables the apparatus to establish a communication session to obtain configuration information or perform diagnostics.

8. The apparatus of claim 1, wherein the storage module is nonvolatile storage.

9. The apparatus of claim 1, wherein the emergency call provisioning information is received as part of a message from a wireless communications network provider.

10. The apparatus of claim 1, wherein the emergency call provisioning information is to provision the apparatus as an emergency call apparatus with eCall only mode functionality.

11. A method, comprising:
 initiating, by a wireless capable device, a network registration procedure;
 sending, from the wireless capable device to a mobile service center, an attach request message;
 receiving, by the wireless capable device in response to the attach request message, an attach response message, wherein the attach response message comprises a subscriber identity that is used to identify the wireless capable device to the MSC and wherein the attach response message further comprises emergency call provisioning information, the emergency call provisioning information including a toggleable indicator that is useable to initiate provisioning of an apparatus as an emergency call only apparatus or an apparatus that functions as a non-emergency call apparatus, the emergency call provisioning information to provision the wireless capable device as an emergency call device, and wherein the emergency call provisioning information is different from the subscriber identity; and
 provisioning the wireless capable device as an emergency call device using the emergency call provisioning information.

12. The method according to claim 11, wherein the emergency call provisioning information is received in a message generated by a wireless communications network provider.

13. The method according to claim 11, wherein the emergency call provisioning information is received in a message generated by a wireless communications network, the message including at least an identification that identifies the wireless capable device to the wireless communications network provider.

14. The method according to claim 13, wherein the message is an Attach message.

15. The method according to claim 11, wherein the act of provisioning provisions the wireless capable device as an emergency call only device.

16. The method of claim 11 further comprising:
 scanning a set of available frequency bands for a forward base channel; and
 locking onto a forward base channel of the set of available frequency bands as part of initiating the network registration procedure; and
 operating the wireless capable device in an eCall only mode where the wireless capable device does not perform mobility management procedures comprising registration on a public land mobile network except as part of an emergency call, a test, or a reconfiguration upon a request from a user.

17. The method of claim 11 wherein the emergency call provisioning information further comprises a timer value and a time value separate from the time value;
 wherein the timer value comprises a time for the wireless capable device to be called back by a public safety answering point associated with the MSC; and wherein the time value comprises a duration for the wireless capable device to interface with test and configuration facilities as part of mobility management procedures of a network.

18. An apparatus configured as an emergency call apparatus, comprising:
a processing module comprising one or more processors, the processing module to initiate a network registration procedure;
a transceiver module coupled to the processing module, the transceiver module to receive and transmit wireless signals, the wireless signals comprising a transmitted attach request message sent from the apparatus to a mobile service center (MSC) after die network registration procedure is initiated by the processing module, and the wireless signals further comprising a received attach response message, the attach response message comprising a subscriber identity that is used to identify the wireless capable device to the MSC and emergency call provisioning information that is different from the subscriber identity; and
a storage module coupled to the processing module, the storage module to store the emergency call provisioning information received by the transceiver module via the Attach Response Message, the emergency call provisioning information including a toggleable indicator that is useable to initiate provisioning of the apparatus as an apparatus that functions as an emergency call apparatus or an apparatus that functions as a non-emergency call apparatus, the emergency call provisioning information to provision the apparatus as a non-emergency call apparatus.

19. The apparatus according to claim 18, wherein the emergency call provisioning information is received in a message generated by a wireless communications network, the message including at least an identification that identifies the wireless capable device to the wireless communications network provider.

* * * * *